United States Patent
Landes et al.

(10) Patent No.: US 9,546,034 B2
(45) Date of Patent: Jan. 17, 2017

(54) LIQUID EXTRACTION MODULE, LIQUID TANK

(75) Inventors: Ewgenij Landes, Remseck (DE); Steffen Schott, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 354 days.

(21) Appl. No.: 13/994,670

(22) PCT Filed: Dec. 12, 2011

(86) PCT No.: PCT/EP2011/072400
§ 371 (c)(1),
(2), (4) Date: Jun. 14, 2013

(87) PCT Pub. No.: WO2012/080147
PCT Pub. Date: Jun. 21, 2012

(65) Prior Publication Data
US 2013/0263939 A1    Oct. 10, 2013

(30) Foreign Application Priority Data

Dec. 14, 2010 (DE) .................... 10 2010 062 997

(51) Int. Cl.
*F01N 3/20* (2006.01)
*B65D 83/00* (2006.01)

(52) U.S. Cl.
CPC ............ *B65D 83/00* (2013.01); *F01N 3/2066* (2013.01); *F01N 2610/02* (2013.01);
(Continued)

(58) Field of Classification Search
USPC .. 137/341; 222/146.1, 146.2, 146.5; 60/286, 60/320; 392/441, 447, 448, 451, 453, 392/455, 465, 471
See application file for complete search history.

(56) References Cited

U.S. PATENT DOCUMENTS 3,239,649 A * 3/1966 Reeve ................. H05B 3/78
222/146.5
4,544,385 A * 10/1985 Tanaka ...................... 96/114
(Continued)

FOREIGN PATENT DOCUMENTS

CN    101523022    9/2009
CN    101828012    9/2010
(Continued)

OTHER PUBLICATIONS

International Search Report for Application No. PCT/EP2011/072400 dated Feb. 16, 2012 (2 pages).

*Primary Examiner* — Kevin Murphy
*Assistant Examiner* — Jonathan Waddy
(74) *Attorney, Agent, or Firm* — Michael Best & Friedrich LLP

(57) ABSTRACT

The invention relates to a liquid extraction module (1) for extracting liquid from a liquid tank, in particular of an exhaust-gas aftertreatment system of a motor vehicle, comprising a basic body (2) which can be arranged in and/or on the vehicle tank and which bears a liquid extraction device (6) with an extraction orifice (5) that can be assigned to the tank interior, and at least one electric heating element (20). According to the invention, at least one heat-conducting element (18) is provided, said element having at least one first portion (24) assigned to the heating element (20) and one second portion (25) assigned to the extraction orifice (5), in order to transport the heat from the heating element (20) to the extraction orifice (5). The invention further relates to a liquid tank for a vehicle.

10 Claims, 8 Drawing Sheets

(52) U.S. Cl.
CPC .. *F01N 2610/10* (2013.01); *F01N 2610/1406* (2013.01); *Y02T 10/24* (2013.01); *Y10T 137/6416* (2015.04)

(56) References Cited

U.S. PATENT DOCUMENTS

| | | | | |
|---|---|---|---|---|
| 4,684,786 | A * | 8/1987 | Mann et al. | 392/441 |
| 6,063,350 | A * | 5/2000 | Tarabulski | B01D 53/90 |
| | | | | 423/212 |
| 6,936,161 | B2 * | 8/2005 | Wright et al. | 210/97 |
| 9,127,583 | B2 * | 9/2015 | Hodgson | F01N 3/2066 |
| 2008/0256937 | A1 * | 10/2008 | Suzuki | 60/300 |
| 2009/0065508 | A1 * | 3/2009 | Haeberer | F01N 3/2066 |
| | | | | 220/562 |
| 2009/0078692 | A1 * | 3/2009 | Starck | F01N 3/2066 |
| | | | | 219/260 |
| 2009/0100824 | A1 * | 4/2009 | Starck | B01D 53/9431 |
| | | | | 60/286 |
| 2010/0154907 | A1 * | 6/2010 | Lecea | F01N 3/2066 |
| | | | | 137/565.29 |
| 2010/0175369 | A1 * | 7/2010 | Op De Beeck | B01D 35/027 |
| | | | | 60/274 |
| 2010/0303453 | A1 * | 12/2010 | Haeberer | F01N 3/2066 |
| | | | | 392/449 |
| 2011/0138790 | A1 * | 6/2011 | Radillo | F01N 3/206 |
| | | | | 60/303 |
| 2013/0048120 | A1 * | 2/2013 | Haeberer | F01N 3/2066 |
| | | | | 137/565.01 |
| 2013/0263938 | A1 * | 10/2013 | Harr | F01N 3/2066 |
| | | | | 137/334 |

FOREIGN PATENT DOCUMENTS

| | | |
|---|---|---|
| DE | 102006027487 | 3/2007 |
| EP | 2299079 | 3/2011 |
| WO | 2007/141312 | 12/2007 |
| WO | WO2008114120 A1 * | 9/2008 |

* cited by examiner

LIQUID EXTRACTION MODULE, LIQUID TANK

BACKGROUND OF THE DESCRIPTION

The invention relates to a liquid extraction module for extracting liquid from a liquid tank, in particular of an exhaust gas after-treatment system of a motor vehicle, comprising a base body which can be arranged in and/or on the vehicle tank and which carries a liquid extraction device with an extraction orifice which can be allocated to the tank interior and at least one electric heating element.

Furthermore the invention concerns a liquid tank for a vehicle, in particular for an exhaust gas after-treatment system of a motor vehicle, with at least one wall having an orifice, wherein in and/or on the liquid tank is arranged a liquid extraction module for extracting liquid from the tank, closing the orifice.

Liquid modules and liquid tanks of the type cited initially are known from the prior art. Thus for example German publication DE 10 2006 027 487 A1 discloses a vehicle tank for aqueous urea solutions which has an orifice in which is inserted a liquid extraction module such that it closes the orifice tightly. The liquid extraction module comprises a base body which carries a liquid extraction device for extracting liquid from the tank. The liquid extraction device comprises at least one extraction channel leading to an extraction orifice, wherein the extraction orifice is allocated to the tank interior. Furthermore the liquid extraction module carries an electric heating element which at low ambient temperatures allows thawing of frozen liquid in the liquid tank, so that even at low temperatures liquid which can be extracted from the liquid tank is or becomes available.

SUMMARY OF THE INVENTION

The liquid extraction module according to the invention has the advantage that liquid in the extraction region is heated and where applicable thawed particularly quickly or first, so that liquid can already be extracted from the liquid tank shortly after a system start, and for example thawed liquid is not prevented by frozen liquid in the extraction region from entering the extraction channel or being extracted from the liquid tank. The liquid extraction module according to the invention is distinguished in that at least one heat-conducting element is provided which has at least one first portion allocated to the heating element and a second portion allocated to the extraction orifice in order to transport the heat from the heat-conducting element to the extraction orifice. In addition to the heating element therefore a preferably separate heat-conducting element is provided which conducts the heat generated by the heating element to the extraction orifice. The heating element preferably extends in a plane, in particular in the form of ribs or a star pattern, to provide thermal energy over a large area. Particularly preferably the heating element also covers or extends over the extraction orifice. Thus liquid in the region surrounding the extraction orifice is reliably heated or thawed. The first portion of the heat-conducting element is allocated to the heating element such that it absorbs the heat emitted by the heating element, while the second portion is allocated to the extraction orifice in order there to emit or radiate the absorbed heat again. In a preferred embodiment the heat-conducting element extends into the extraction orifice to guarantee reliable thawing of the entire extraction region. The first portion of the heat-conducting element is arranged preferably spaced apart from the heating element so that no additional stresses are caused for example on distortions of the liquid extraction module during operation. In a preferred alternative embodiment the first portion lies on the heating element so that a touch contact occurs and the heat emitted from the heating element is transmitted directly to the heat-conducting element, whereby heat losses are reduced.

Preferably the heat-conducting element is formed as a heat-conducting pin, a heat-conducting sleeve or a heat-conducting plate. Preferably the first portion of the respective heat-conducting element is allocated to the underside or a side face of the heating element. The heat-conducting pin is distinguished by a preferably at least substantially cylindrical form and is preferably held as a bolt in a corresponding orifice for example of the base body. The heat-conducting sleeve differs from the heat-conducting pin in that it has an at least substantially annular cross section and is thus formed as a hollow cylinder. The respective first portions of the heat-conducting pin and heat-conducting sleeve are preferably formed by a respective face so that the heat-conducting pin or heat-conducting sleeve is preferably oriented perpendicular to the underside of the heating element. The second portion is preferably formed by the second face or by the end of the heat-conducting pin or heat-conducting sleeve lying opposite the first face. Thus the heat-conducting pin or heat-conducting sleeve can be guided to shortly before the extraction orifice or terminate before this, or protrude into the extraction orifice so that the respective end region is allocated to the extraction orifice or is introduced therein in regions. The heat-conducting plate is distinguished by a plate structure i.e. is formed planar, preferably with a substantially rectangular cross section. Particularly preferably the first portion of the heat-conducting plate formed as a heat-conducting element is formed by one end region and the second portion by a second end region. Particularly preferably the heat-conducting plate is formed as an angled plate or has at least one angle so that the first end portion is preferably oriented perpendicular to the second end portion. Particularly preferably the first end portion of the heat-conducting plate or the first portion of the heat-conducting element is allocated to a side face of the heating element while the second end portion or second portion extends over the extraction orifice.

Particularly preferably the extraction orifice is formed by the base body. In other words the extraction element is formed integrally with the base body or is formed by an orifice in the base body. Preferably the extraction orifice is adjacent to the extraction channel which is preferably also formed by the base body and/or by the liquid extraction device and which leads to a connection accessible from the outside, which for example is formed as a connector in particular integrally with the base body and/or the liquid extraction device.

Preferably the heat-conducting sleeve is introduced in regions into the extraction orifice, in particular by force fit. Thus the outer diameter of the heat-conducting sleeve and the inner diameter of the extraction orifice are selected such that they correspond, in order to form a press joint. Thus the heat-conducting sleeve is securely attached to the base body without further aids being required.

According to an advantageous refinement of the invention, it is proposed that the heat-conducting plate is formed as a perforated heat-conducting plate, and/or the heat-conducting sleeve is formed as a laterally slotted heat-conducting sleeve. The slotted design of the heat-conducting sleeve and the perforated design of the heat-conducting plate allow particularly close arrangement of the heat-conducting plate or heat-conducting sleeve to the extraction orifice without the liquid being prevented from penetrating into the extraction orifice by the respective heat-conducting element. Furthermore the perforated or slotted design of the respective heat-conducting element saves weight.

According to an advantageous refinement of the invention, it is provided that a filter element is arranged between the heating element and the extraction orifice. The filter element serves to filter the liquid before it is aspirated through the extraction orifice and guided into the extraction channel. Preferably the liquid extraction device comprises a delivery device, such as for example a pump, to deliver the liquid from the tank interior through the extraction orifice. Particularly preferably the delivery device is formed integrally in the base body of the liquid extraction module or arranged therein.

The filter element preferably has an orifice in which the heat-conducting element is arranged or held. The filter element for this preferably also has a supporting structure which carries filter mesh. The supporting structure is preferably formed of plastic and has a passage opening at a point in particular opposite the extraction orifice. The respective heat-conducting element is held in the passage opening preferably by force fit and in particular tightly.

According to an advantageous refinement of the invention, it is provided that the heat-conducting pin is formed integrally with the heating element or with a sheathing of the heating element. Thus the sheathing of the heating element preferably comprises a cylindrical protrusion forming the heat-conducting pin and extending in the direction of the extraction orifice. Particularly preferably the heat-conducting pin extends through the passage opening of the filter element, wherein here a force-fit connection between the heat-conducting pin and filter element or passage opening is not necessary but can be provided in the manner of a catch.

The liquid tank according to the invention is distinguished by a liquid extraction module as described above. The base body of the liquid extraction module and the wall of the tank are preferably made of the same material, in particular the same plastic, particularly preferably of HDPE plastic (HDPE=high density polyethylene) and are welded together in the contact region. Preferably the orifice of the liquid tank is arranged in a floor formed by the wall so that the liquid extraction module preferably forms the lowest part of the liquid tank, in order always to make optimum use of the liquid volume present in the liquid tank and in order to make best possible use of the thermal energy available. Alternatively it is naturally also conceivable to attach the base body on the wall of the tank by screwing, clamping or similar. Also it is conceivable to provide the base body and the wall orifice with a bayonet closure, by means of which the liquid extraction module can be attached on the liquid tank in a simple manner. Additionally or alternatively an adhesive can be provided for fixing and/or for sealing.

BRIEF DESCRIPTION OF THE DRAWINGS

The invention will be explained in more detail below with reference to the drawings. These show.

DETAILED DESCRIPTION

Figure 1:
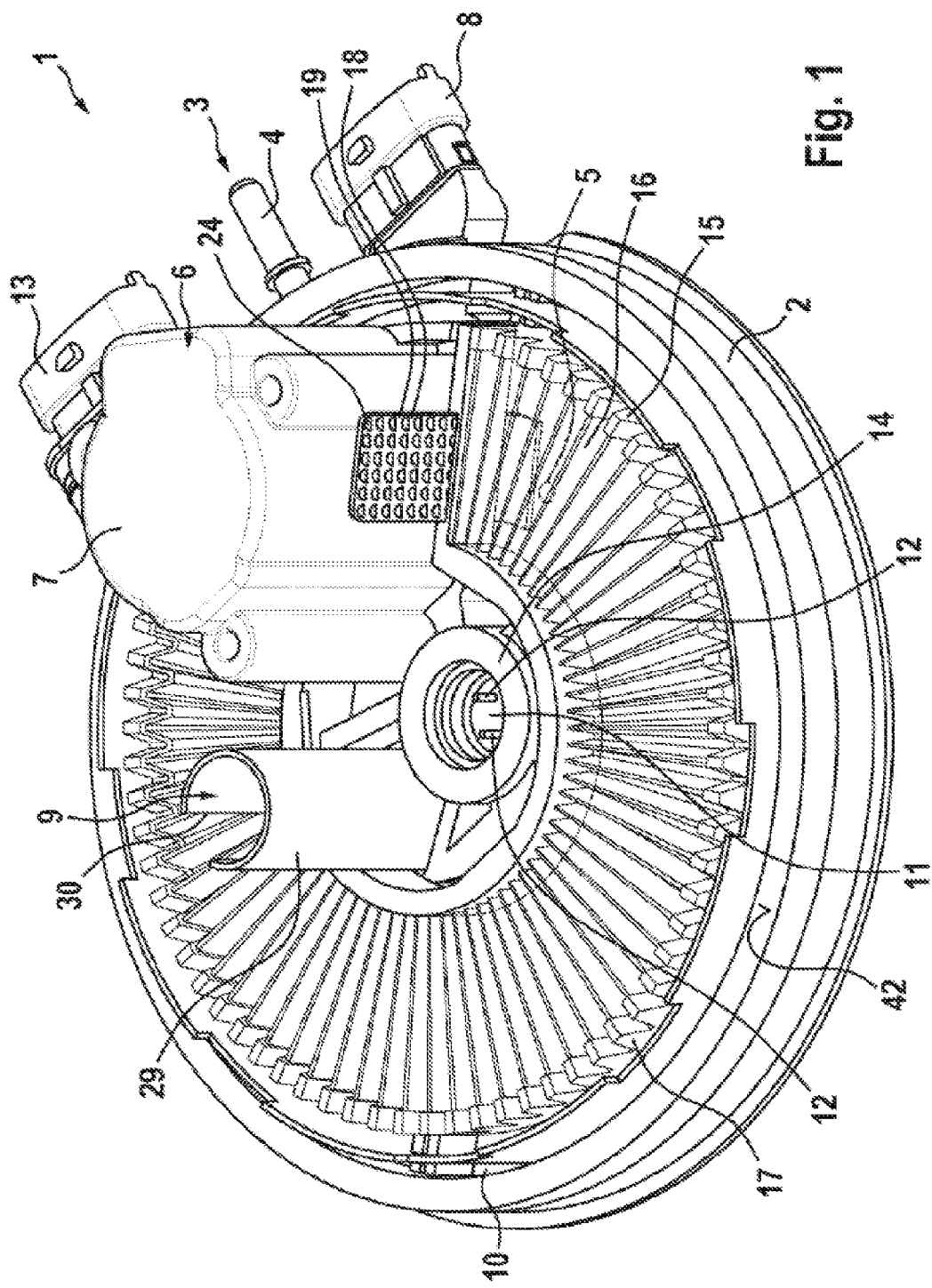
FIG. 1 a liquid extraction module according to a first embodiment example.

FIG. 1 shows a perspective view of a liquid extraction module 1 according to a first embodiment example. The liquid extraction module 1 comprises a base body 2 which is preferably made of plastic and has a circular base form. The liquid extraction module 1 or the base body 2 respectively is formed such that it can be arranged in an orifice of a wall of a liquid tank such that it closes the orifice tightly. The base body 2 comprises an extraction channel 3 which leads from a connection 4, accessible from the outside, to an extraction orifice 5 which is arranged on the side of the base body 2 facing the tank interior. The extraction channel 3 is formed in regions by a liquid extraction device 6 which is arranged at least partly in a housing 7 formed by the base body 2, and protrudes into the tank interior. The liquid extraction channel 3 is here formed only partly by the base body 2. It is formed further by the liquid extraction device 6 which is inserted in the housing 7 and in the present embodiment example is not completely accommodated by the base body 2, so that it is exposed on the side facing away from the tank interior. The liquid extraction device and the base body 2 are tightly connected together by corresponding sealing elements. Electric lines from the liquid extraction device 6 run through the base body 2 to a plug 8 which is accessible from the outside in the fitted state and is preferably formed integrally with the base body 2 or held thereon by molding. Furthermore the liquid extraction module 1 comprises a fill level detection device 9, the design of which will be described in more detail below. The base body 2 forms a floor region 10 in which the extraction orifice 4 also lies and from which the housing 7 protrudes. In the center, the base body 2 has in the floor 10 a recess 11 which at least in regions is formed frustoconical. Two connection contacts 12 protrude axially into the recess and transform into or are electrically connected with lines leading through the base body 2. These electric lines lead to a second plug 13 accessible from the outside in the mounted state. The recess 11 is surrounded or delimited by a circular contact surface 14.

Furthermore the liquid extraction module 1 comprises a filter element 15 which is formed in the manner of a circular ring segment and has a filter mesh 16 which is held by a molded supporting structure 17. The filter element 15 lies on the floor 10 of the base body 2 such that it covers the extraction orifice 5. In the supporting structure 17 is furthermore held a heat-conducting element 18 formed as a perforated heat-conducting plate 19. The filter element 15 or in particular the filter mesh 16 is designed preferably without folds/pleats in the extraction region so that the heat in this region can spread and be used for thawing more quickly.

Figure 2:
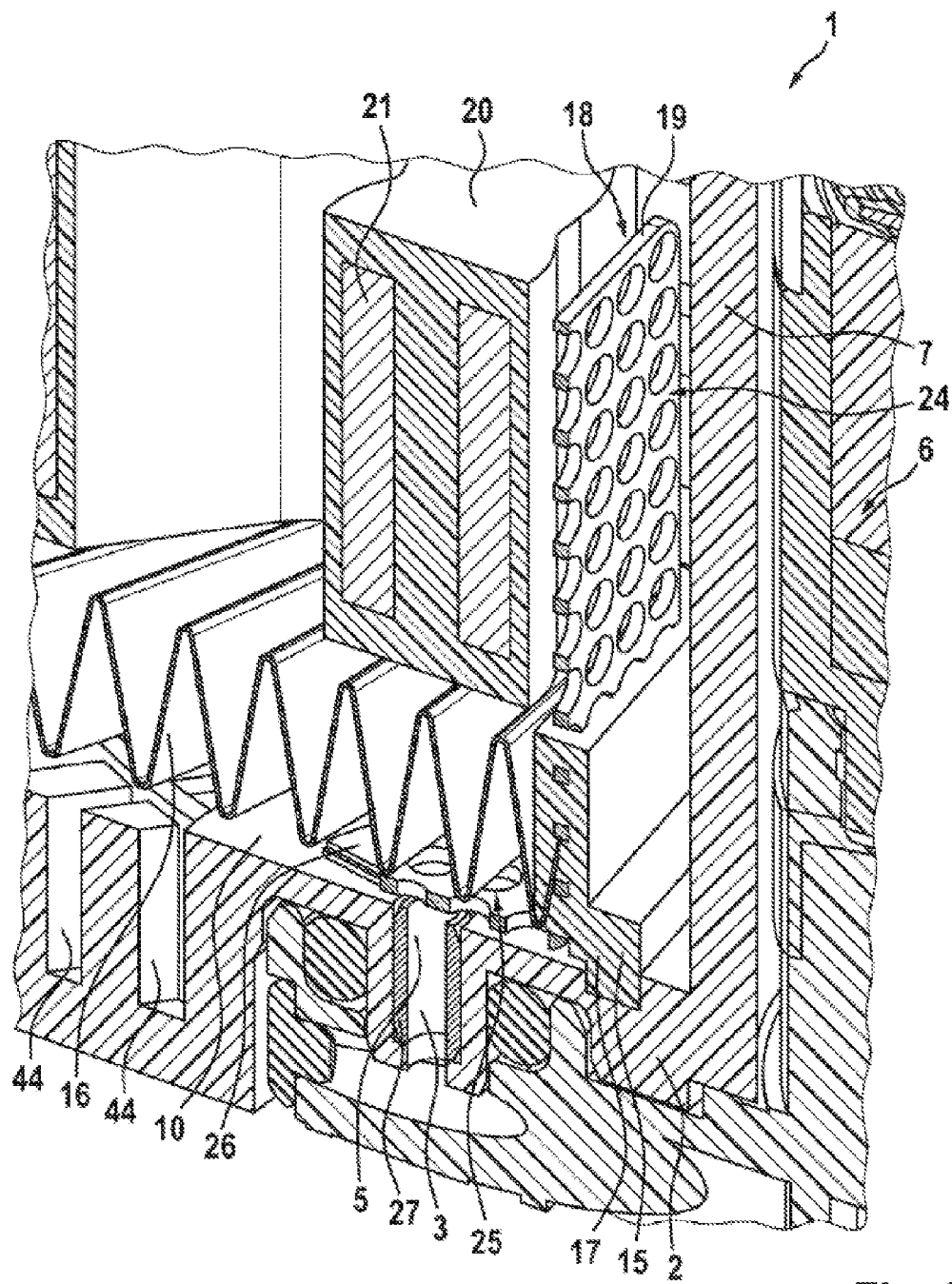
FIG. 2 a section view of the liquid extraction module.

Above the filter element 15 is arranged an electric heating element 20, as shown in enlarged section view in FIG. 2. For reasons of clarity the heating element 20 is not shown in FIG. 1. The heating element 20 extends in the manner of ribs or a framework, as shown for example in FIG. 8, at least substantially over the entire surface of the filter element 15. The heating element 20 comprises a heating body 21 preferably formed from aluminum and a plastic sheathing 22 which surrounds the aluminum body 21 completely.

Figure 3:
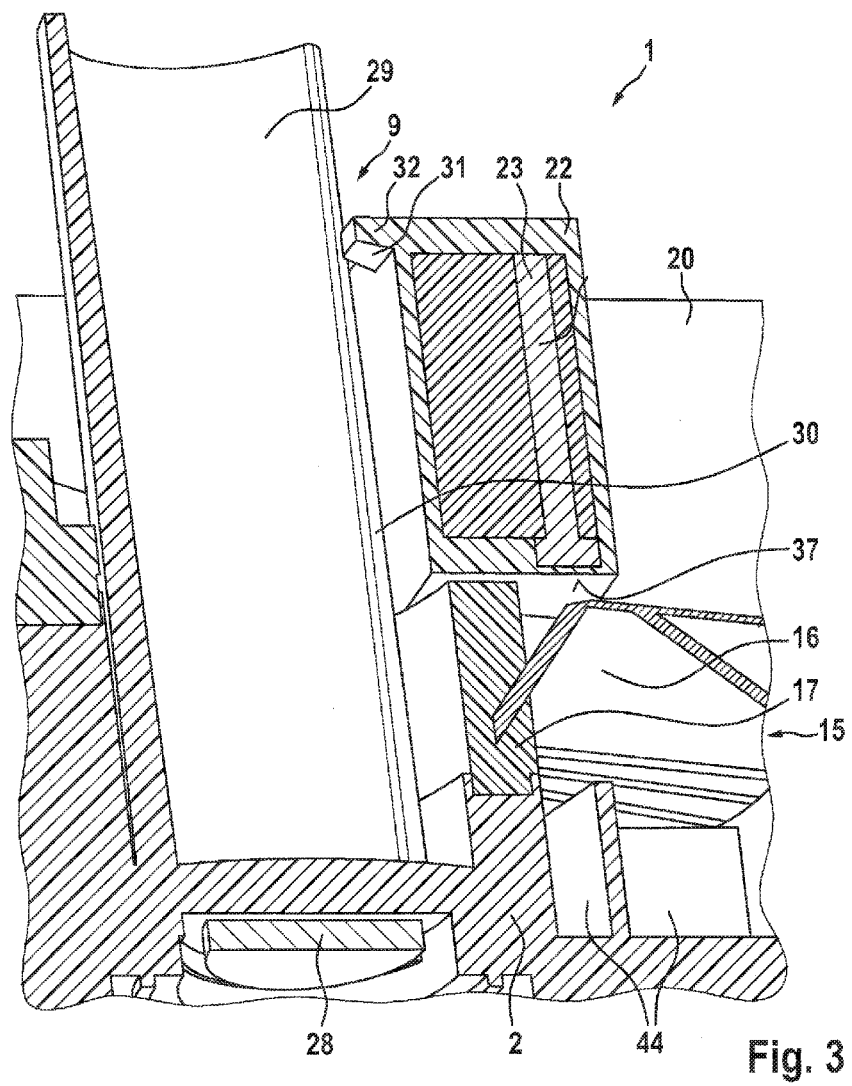
FIG. 3 a further section view of the liquid extraction module.

As evident from FIG. 3 which shows a further section view of the liquid extraction module 1, the heating element 20 has at least one and preferably two PTC heating elements 23 which are preferably held in receiver pockets of the heating body 21 and accommodated by the plastic sheathing 22. The PTC heating elements 23 can be electrically connected with the contact connectors 12 of the base body 2.

As evident from FIG. 2, the heat-conducting element 18 has a first portion 24 allocated to the heating element 20 and a second portion 25 allocated to the extraction orifice 5. The heat-conducting plate 19 is formed as an angled plate, wherein the first portion 24 is oriented at a right angle to the second portion 25. The heat-conducting plate 19 in the present embodiment example is held by molding of the supporting structure 17 of the filter element 15 so that it is held by form fit on or in the filter element 15. The first portion 24 extends parallel to a side wall of the heating element 20 and is arranged in the immediate vicinity of the heating element 20 so that the heat emitted by the heating element 20 is transmitted to the heat-conducting plate 19. The heat-conducting element 18 or heat-conducting plate 19 is preferably made of a material with a high thermal conductivity coefficient so that the thermal energy absorbed is transmitted with only low heat losses to the portion 25 which extends over the extraction orifice 5 and is arranged close to this. The base body 2, on the floor 10 surrounding the extraction orifice 5, has several protrusions 26 which are spaced apart in the circumferential direction and guarantee that the extraction orifice 5 cannot be closed by the heat-conducting element 18 or heat-conducting plate 19. The perforated design of the heat-conducting plate 19 has the same effect so that the extraction of liquid is always guaranteed and a simple installation is possible.

The heat-conducting element 18 thus conducts the heat emitted from the heating element 20 to the extraction orifice 5 so that at low ambient temperatures, liquid which is in the vicinity of the extraction orifice 5 or in the region of the extraction channel 3 close to the extraction orifice 5 and which has frozen, is thawed rapidly in order to be able to provide within a short time liquid which can be aspirated by the liquid extraction device 6 or its pump from the tank interior through the extraction channel 3 and delivered to a corresponding point.

According to the present embodiment example, a further heat-conducting element 18 is provided which is formed as a heat-conducting sleeve 27 and is arranged in the extraction channel 3 forming the extraction orifice 5. The heat-conducting sleeve 27 is introduced into the extraction orifice 5, whereby the thermal energy transported by the heat-conducting plate 19 is conducted further into the extraction channel 3 in order to accelerate the thawing process or allow the thawing process at points further remote from the heating element 20. Alternatively the heat-conducting sleeve can also be formed simply as a supporting sleeve without particular heat conduction properties.

FIG. 3 shows a section through the liquid extraction module 1 in the region of the fill level detection device 9. This comprises a fill level sensor 28 and a reflection tube 29. The reflection tube 29 is formed integrally with the base body 2 and extends vertically past the heating element 20. The reflection tube 29, as shown most clearly in FIG. 1, is formed slotted on the side wherein the linear slot 30 is allocated to the heating element 20 so that liquid in the reflection tube 29 is thawed particularly quickly. The fill level sensor 28 is arranged on the closed underside of the reflection tube 29 and detects the fill level of the liquid tank contactlessly by means of ultrasound waves. The reflection tube 29 can alternatively also be formed (×2) hopper-like. The linear slot 30 guarantees that the liquid level in the reflection tube 29 corresponds to the liquid level in the liquid tank. Alternatively instead of the linear slot 30, a simple opening can be provided in the casing wall for draining or adding liquid. The length of the reflection tube is preferably selected such that the measurement accuracy in the lower third of the fill level range of the liquid tank is particularly high, or the reflection tube extends over the lower third of the liquid tank. To guarantee the signal quality of the fill level detection device 9 irrespective of changing temperature and liquid density, and/or at the same time detect the absence of liquid, a reference surface 31 is provided which in the present embodiment example is formed by the plastic sheathing 22 of the heating element 20. For this the plastic sheathing 22 has a protrusion 32 protruding into the linear section 30 of the reflection tube 29, the underside of which, allocated to the fill level sensor 28, forms the reference surface 31. Alternatively the reference surface can also be formed by the base body 2, the filter element 15 or another element of the liquid extraction module 1.

Figure 4:
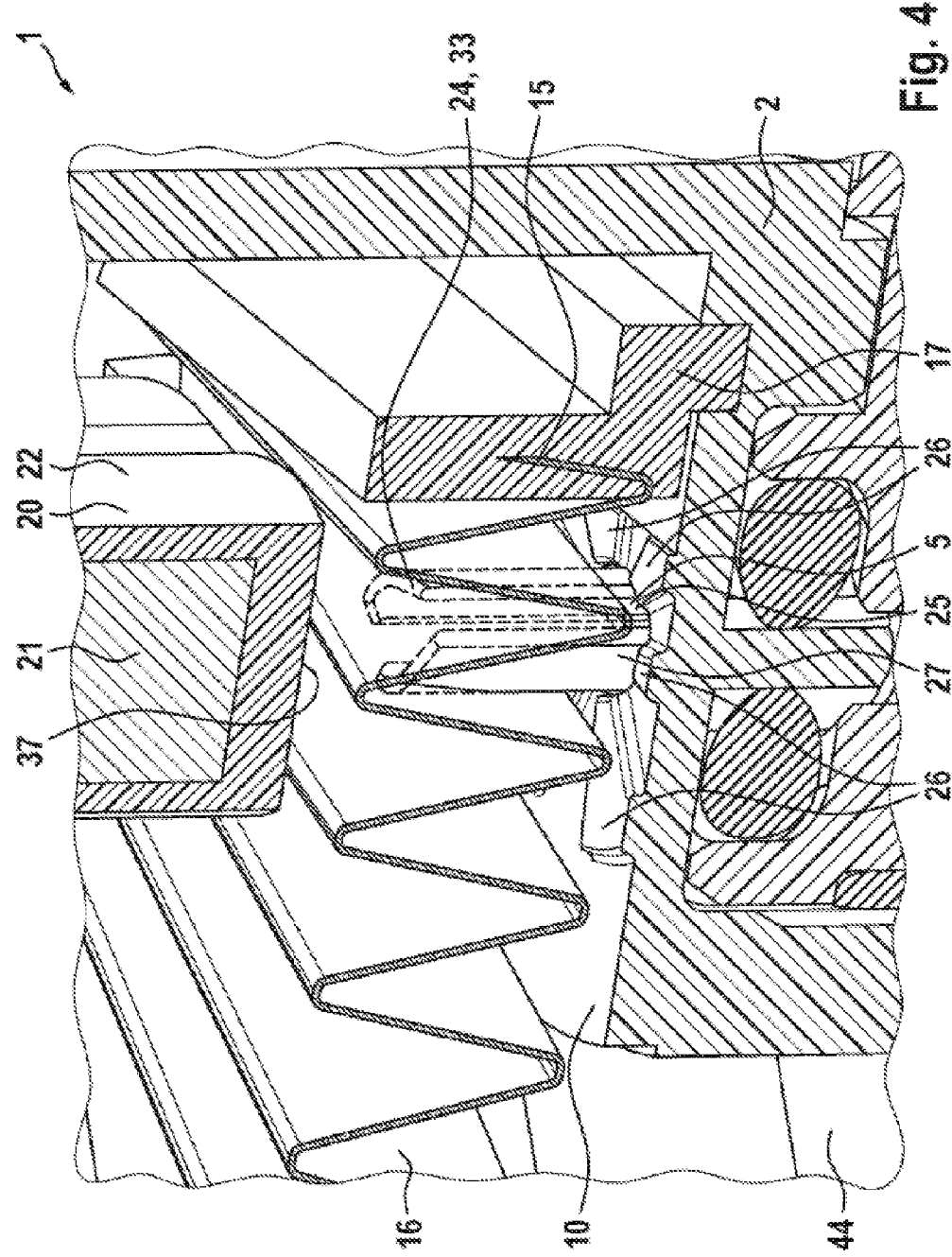
FIG. 4 the liquid extraction module according to a further embodiment example, FIG. 5 the liquid extraction module according to a further embodiment example, FIG. 6 the liquid extraction module according to a further embodiment example, FIG. 7 an electric heating element of the liquid extraction module, and FIG. 8 a further embodiment example of the liquid extraction module.

FIG. 4 in an enlarged section view shows the liquid extraction module 1 according to a further embodiment example. According to this embodiment example only one heat-conducting element 18 is provided, namely the heat-conducting sleeve 27 which is formed laterally slotted and protrudes from the floor 10 of the base body 2 into the filter element 15. The free end 33 here forms the first portion 24 of the heat-conducting element 18, while the region of the laterally slotted heat-conducting sleeve 27 lying in the extraction orifice 5 forms the second portion 25. According to this embodiment example therefore the heat from the heating element 20 is transmitted or transported into the extraction region by means of the heat-conducting sleeve 27.

The lateral slots of the heat-conducting sleeve 27 extend to the level of the floor 10 so that the height of the extraction orifice 5 does not change. In addition the heat-conducting sleeve is suitably formed or arranged such that the filter mesh 16 is not damaged.

Figure 5:
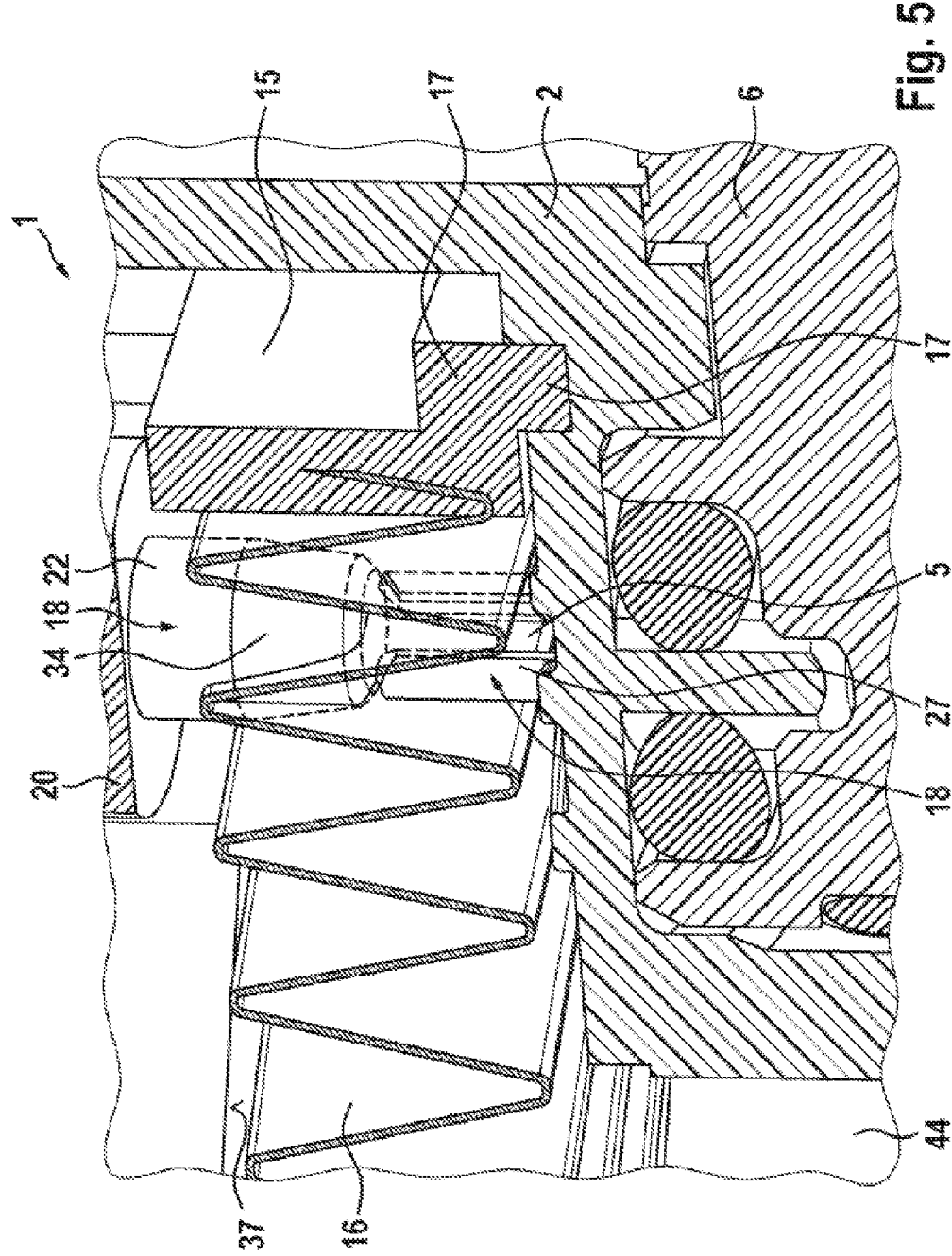

FIG. 5 shows a further embodiment example of the liquid extraction module 1 in a section view, wherein the embodiment example differs from the previous one in that the plastic sheathing 22 of the heating element 20 forms a heat-conducting pin 34 which also constitutes a heat-conducting element 18. The heat-conducting pin 34 is arranged opposite the extraction orifice 5 and extends in its direction so that the heat from the heating element 20 is transported in the direction of the extraction region and the distance from the heat-conducting sleeve 27 is reduced. Particularly preferably the filter mesh has a cutout in the region of the heat-conducting elements 18 so that the heat-conducting elements 18 can be guided close to each other.

Figure 6:
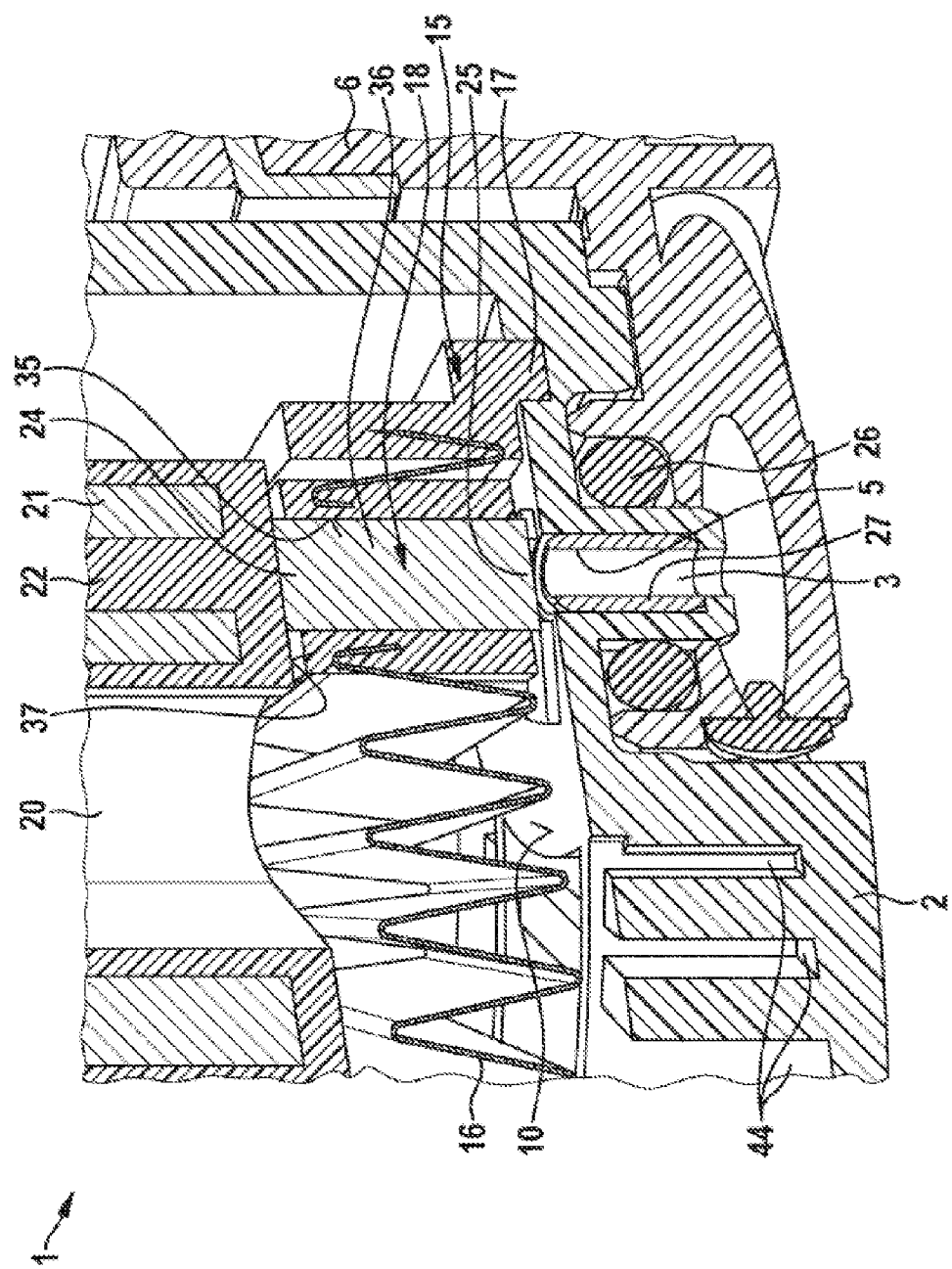

FIG. 6 in a further embodiment example shows the liquid extraction module 1 which differs from the embodiment example in FIG. 4 in particular in that the filter element 15 in the region of the extraction orifice 5 has an expanded supporting structure 17 in which is formed an orifice 35 which lies in the theoretical extension of the extraction orifice 5 in the direction of the heating element 20. A heat-conducting pin 36 is held in the orifice 35 by form and force fit. Its one end forms the portion 24 while the opposite end forms the portion 25 of the heat-conducting element 18 so that the one face is allocated to the heating element 20 and the other face to the extraction orifice 5. Due to the protrusions 26 described above on the floor 10 of the base body 2, it is guaranteed that liquid can always enter the extraction orifice 5. In the floor 10 are furthermore formed dirt traps 44 which serve to prevent dirt particles from entering the extraction orifice 5. The dirt particles are collected in the respective dirt trap 44 and held therein even on stronger movements of the liquid extraction module 1, so they do not float up again.

Figure 7:
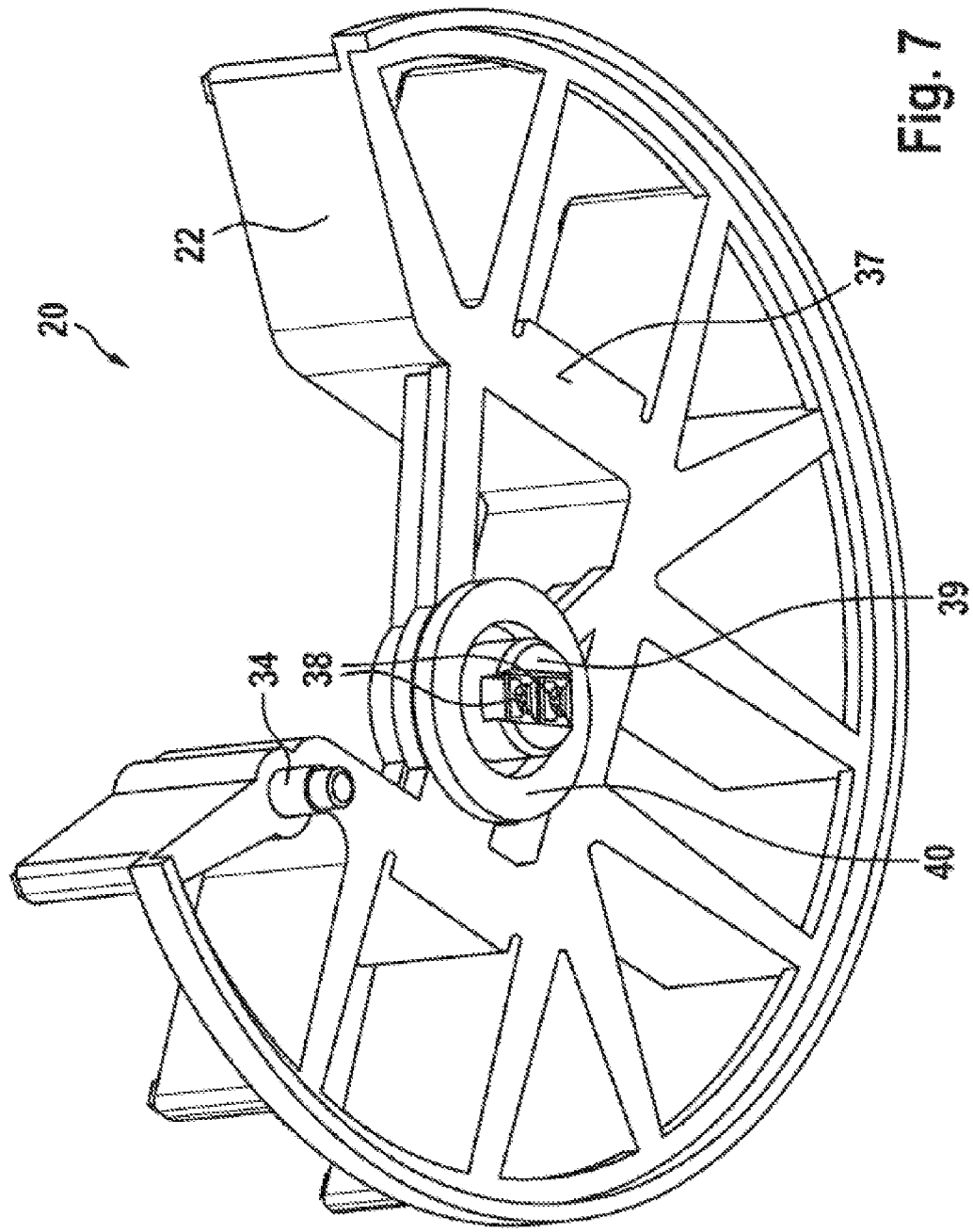

FIG. 7 shows the heating element 20 with the heat-conducting pin 34 in a perspective view. The plastic sheathing 22 of the heating element 20 is preferably made of the same plastic as the base body 2 and in addition contains at least one filler with high thermal conductivity. The filler is preferably a mineral filler and/or glass fibers. Advantageously the filler constitutes a volume proportion of substantially 10% or a weight proportion of substantially 30% of the plastic sheathing 22.

On its underside 37 the heating element 20 has connection contacts 38 arranged approximately centrally, which lead to the PTC heating element 23 held by the plastic sheathing 22. The connection contacts 38 are formed as sockets and are arranged on a free face of a substantially frustoconical protrusion 39 of the plastic sheathing 22. The plastic sheathing 22, on the underside 37 arranged coaxial to the protrusion 29, furthermore has an annular contact area 40, the diameter of which corresponds to the diameter of the contact surface 14 of the base body 2. On assembly the heating element 20 is placed on the base body 2 as shown in FIG. 1 such that the protrusion 39 is introduced in the recess 11. The connecting contacts 12 designed as pins are automatically introduced in the connecting contacts 38 formed as sockets. The protrusion 39 and the recess 11 are formed such that they fit radially into each other by form fit. The contact surface 40 comes to lie on the contact surface 14. By a welding process, in particular by heating element welding, the contact surfaces 40 and 14 are welded together whereby a sealed and robust connection is created between the heating element 20 and the base body 2. As both elements are made of the same plastic, preferably HDPE (high density polyethylene), the weld connection can be guaranteed particularly securely. Because of the at least one filler in the plastic sheathing 22, this has a higher thermal conductivity than the base body 2. By welding with the base body 2, a particularly compact liquid extraction module 1 is achieved which is easy to handle and guarantees a long service life.

Figure 8:
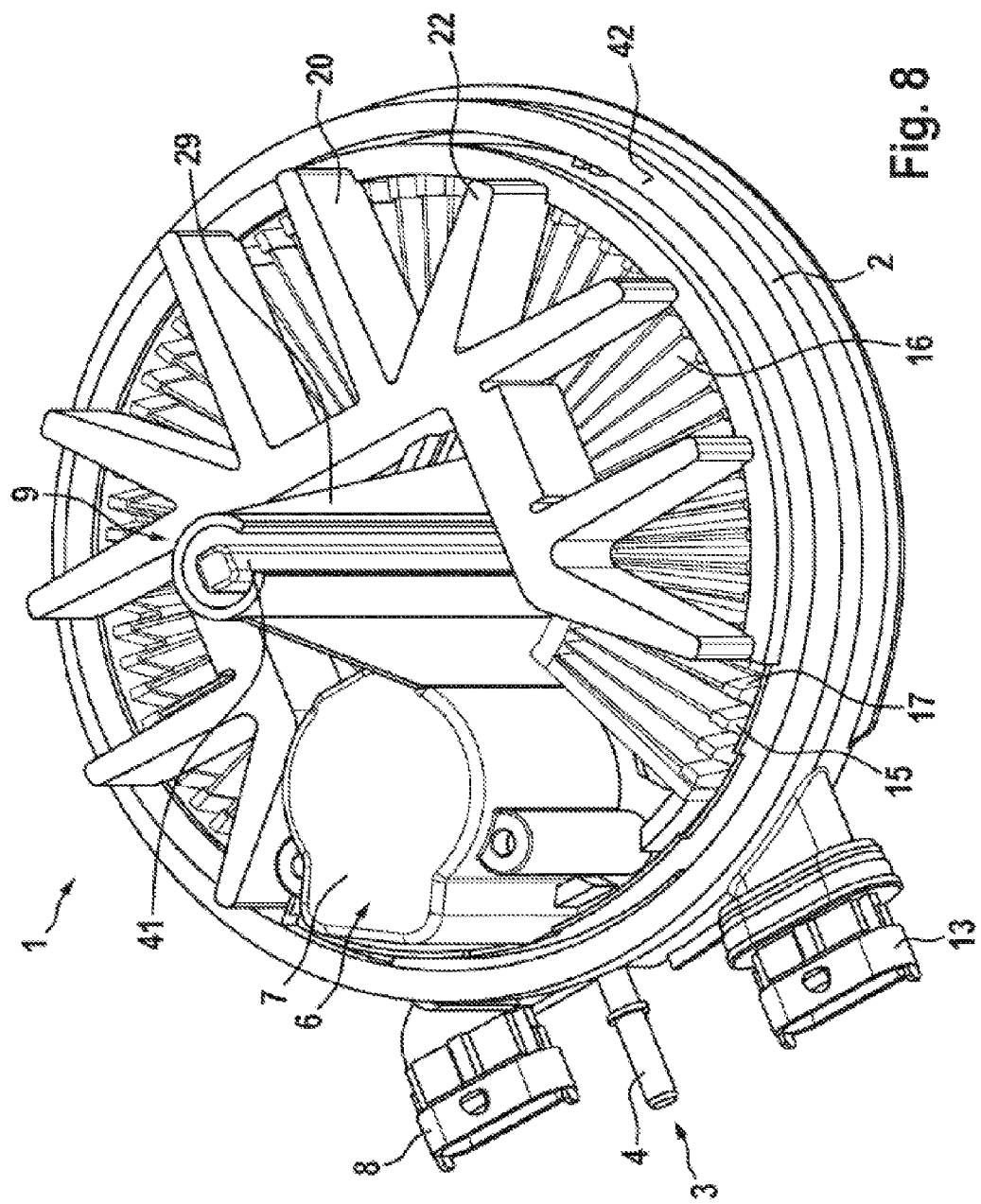

FIG. 8 shows a further embodiment example of the liquid extraction module 1 which differs from the preceding embodiment examples substantially in that the fill level detection device 9 has a fill level sensor 41 working by contact, which extends through the reflection tube 29 and is protected thereby from dirt and further external influences such as for example the effect of force from ice formation.

Preferably the heat-conducting elements 18 described above are formed from a metal material with good heat conduction properties. Alternatively the heat-conducting elements 18 can be made of a highly heat-conductive plastic, for example containing the filler described above, in order to reduce costs. It is also conceivable to provide plastic components with integral heat-conducting elements made of plastic with inset parts with high thermal conductivity molded in and/or attached by molding. Preferably the liquid extraction module 1 on its side pointing away from the tank interior furthermore has a stone impact protection plate which prevents damage on installation of the liquid extraction module or liquid tank in the floor of the vehicle. This stone impact protection can be used also to protect from thermal overheating/heat, for example when arranged in the vicinity of the exhaust tract of the motor vehicle. Also the stone impact protection plate can serve as a wind deflector in particular to prevent freezing at low temperatures or to support or relieve the load on the liquid extraction module 1 on thawing of frozen liquid. Thereby with the same heating power, more liquid can be thawed and the load on the environment reduced due to the lower energy consumption.

To attach the liquid extraction module 1 to the liquid tank, not shown here in detail, the base body 2 has an axial contact surface 42 which extends over the entire periphery of the base body 2 and can be placed on a correspondingly formed counter-contact surface of the liquid tank or the wall of the liquid tank. By welding the base body 2 with the wall of the liquid tank at the contact surface 42, a sealed and firm connection is achieved between the liquid extraction module 1 and the liquid tank, wherein parts of the liquid extraction module 1, in particular the housing 7, reflection tube 29, where applicable a heat-conducting element 18 and the heating element 20, protrude into the tank interior of the liquid tank through the orifice in the wall. As already described above, the orifice is preferably arranged in the floor of the liquid tank.

What is claimed is:

1. A liquid extraction module (1) for extracting liquid from a liquid tank, wherein the extraction module comprises a base body (2) which can be arranged in and/or on the tank and which carries a liquid extraction device (6) in the form of a pump, with an extraction orifice (5) which extends through the base body on the side of the base body facing the tank interior, and at least one electric heating element (20), characterized in that at least one heat-conducting element (18) is provided which has at least one first portion (24) allocated to the heating element (20) and a second portion (25) allocated to the extraction orifice (5) in order to transport the heat from the heating element (20) to the extraction orifice (5), and wherein a filter element (15) configured to filter the liquid is arranged between the heating element (20) and the extraction orifice (5).

2. The liquid extraction module as claimed in claim 1, characterized in that the heat-conducting element (18) is formed as a heat-conducting pin (34, 36), a heat-conducting sleeve (27) or a heat-conducting plate (19).

3. The liquid extraction module as claimed in claim 2, characterized in that the heat-conducting sleeve (27) is introduced into the extraction orifice (5).

4. The liquid extraction module as claimed in claim 2, characterized in that the heat-conducting plate (19) is formed as a perforated heat-conducting plate, or the heat-conducting sleeve (27) is formed as a laterally slotted heat-conducting sleeve (27).

5. The liquid extraction module as claimed in claim 2, characterized in that the heat-conducting sleeve (27) is introduced into the extraction orifice (5) by force fit.

6. The liquid extraction module as claimed in claim 1, characterized in that the first portion (24) of the heat-conducting element (18) is allocated to an underside (37) or a side face of the heating element (20).

7. The liquid extraction module as claimed in claim 1, characterized in that the extraction orifice (5) is formed by the base body (2).

8. The liquid extraction module as claimed in claim 1, characterized in that the filter element (15) has an orifice (35) in which the heat-conducting element (18) is arranged or held.

9. The liquid extraction module as claimed in claim 1, characterized in that a heat-conducting pin (34) is formed integrally with the heating element (20) or with a sheathing (22) of the heating element (20).

10. A liquid tank for a vehicle, with at least one wall having an orifice, wherein in and/or on the liquid tank is arranged a liquid extraction module (1) for extracting liquid from the tank, characterized by the formation of the liquid extraction module (1) as claimed in claim 1.

\* \* \* \* \*